United States Patent
Yano

(10) Patent No.: US 6,807,007 B2
(45) Date of Patent: Oct. 19, 2004

(54) IMAGE-BLUR CORRECTING VIEWING-OPTICAL SYSTEM

(75) Inventor: Takaaki Yano, Hokkaido (JP)

(73) Assignee: PENTAX Corporation, Tokyo (JP)

( * ) Notice: Subject to any disclaimer, the term of this patent is extended or adjusted under 35 U.S.C. 154(b) by 61 days.

(21) Appl. No.: 10/141,186

(22) Filed: May 9, 2002

(65) Prior Publication Data
US 2002/0196543 A1 Dec. 26, 2002

(30) Foreign Application Priority Data
May 10, 2001 (JP) ........................................ 2001-139884

(51) Int. Cl.$^7$ ............................................. G02B 27/64
(52) U.S. Cl. ....................... 359/554; 359/555; 359/556; 359/557
(58) Field of Search ................................ 359/554, 555, 359/556, 557, 692, 676, 431, 432; 396/52, 53

(56) References Cited

U.S. PATENT DOCUMENTS

| | | | | |
|---|---|---|---|---|
| 5,140,462 A | * | 8/1992 | Kitagishi | 359/554 |
| 5,754,339 A | | 5/1998 | Kanai et al. | 359/557 |
| 6,046,853 A | | 4/2000 | Yano | 359/557 |
| 6,072,630 A | | 6/2000 | Yano | 359/557 |
| 6,118,585 A | | 9/2000 | Kanai | 359/557 |
| 6,198,575 B1 | | 3/2001 | Yano | 359/557 |
| 6,226,123 B1 | | 5/2001 | Kanai et al. | 359/557 |
| 6,249,380 B1 | | 6/2001 | Yano | 359/557 |
| 6,392,804 B1 | | 5/2002 | Yano et al. | 359/557 |
| 6,512,633 B2 | * | 1/2003 | Konno et al. | 359/557 |
| 2001/0022696 A1 | * | 9/2001 | Nishio | 359/687 |

FOREIGN PATENT DOCUMENTS

| | | |
|---|---|---|
| JP | 11264942 | 9/1999 |
| JP | 2001-51209 | 2/2001 |

* cited by examiner

*Primary Examiner*—Drew A. Dunn
*Assistant Examiner*—Joshua L Pritchett
(74) *Attorney, Agent, or Firm*—Greenblum & Bernstein, P.L.C.

(57) ABSTRACT

An image-blur correcting viewing-optical system includes an objective optical system, an image-erecting optical system and an eyepiece optical system. The objective optical system includes a front lens group having a positive lens element, a negative lens element and a positive lens element, and a rear lens group constituting an image-blur correcting lens element which is driven in a direction perpendicular to the optical axis; and the image-blur correcting viewing-optical system satisfies the following condition:

$$0.5 \leq hc/hmax \leq 0.8 \qquad (1)$$

wherein hc designates the radius of an axial open aperture of the first surface of the image-blur correcting lens element; and hmax designates the radius of an axial open aperture of the first surface of the front lens group of the objective optical system.

3 Claims, 8 Drawing Sheets

ER 3.0

— d Line
······ g Line
--- C Line

-1   1

SPHERICAL
ABERRATION

CHROMATIC
ABERRATION

B=24.8

-0.1   0.1

LATERAL
CHROMATIC
ABERRATION

B=24.8

— S
-- M

-2   2

ASTIGMATISM

B=24.8

-5 (%) 5

DISTORTION

-0.10        B=      0.000
             W=      0.000
             DIS=    0.000
             DS=     0.000
+0.10        DM=     0.000

SPHERICAL ABERRATION
CHROMATIC ABERRATION

LATERAL CHROMATIC ABERRATION

ASTIGMATISM

DISTORTION

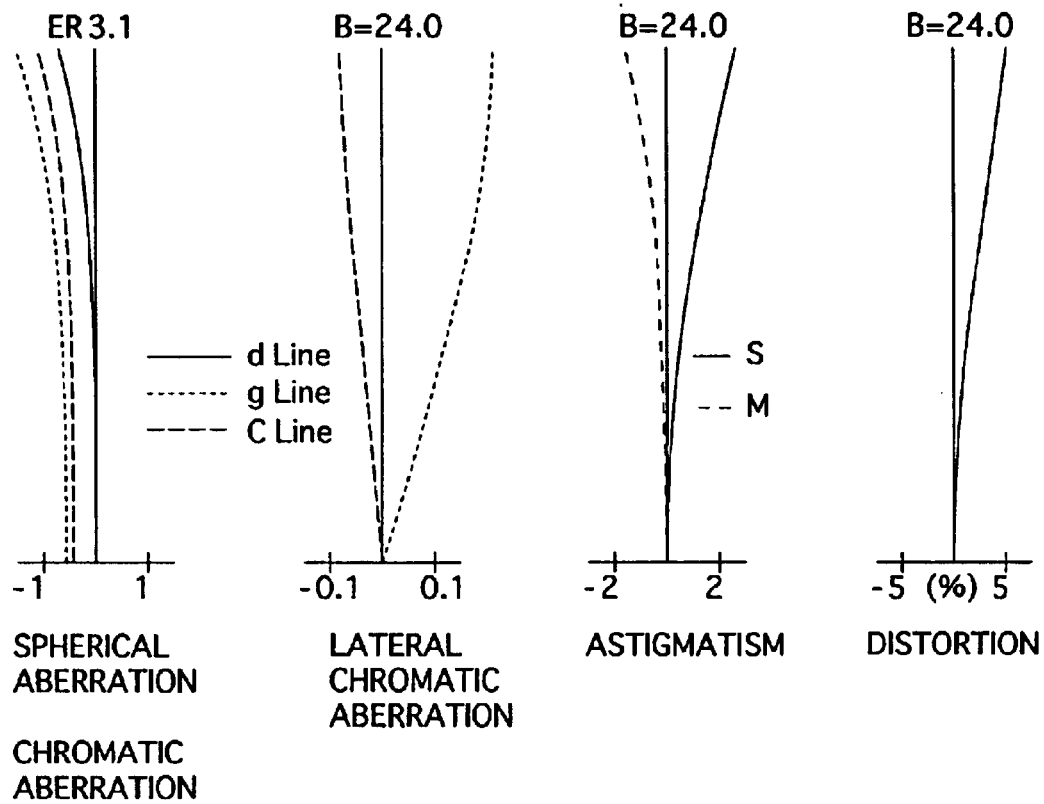
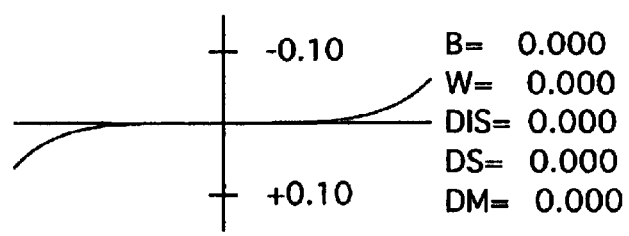

IMAGE-BLUR CORRECTING VIEWING-OPTICAL SYSTEM

BACKGROUND OF THE INVENTION

1. Field of the Invention

The present invention relates to an image-blur correcting viewing-optical system which corrects blur of an image by driving an image-blur correcting lens element in a direction perpendicular to the optical axis in accordance with the magnitude of a shake imposed on the viewing-optical system.

2. Description of the Prior Art

At least two types of image-blur correcting viewing-optical systems have been known in the art:

(1) type-i: employing a variable angle prism; and (2) type-ii: employing an image-blur correcting lens element to be driven in a direction perpendicular to the optical axis.

In the case where a variable angle prism is employed (the above type-i), since the boundary surfaces thereof exposed to the air are flat, spherical aberration is inherently occurred, thereby decentration-coma and chromatic aberration inevitably occur.

On the other hand, in the case where an image-blur correcting lens element is employed (the above type-ii), since enough space for the image-blur correcting lens element to retreat has to be provided, and a space for a drive mechanism thereof is required, the size of the entire optical system has to become larger. The shape of the image-blur correcting lens element is, in particular, designed so that the shape of the exit pupil does not change even when the image-blur correcting lens element is decentered by the maximum amount in a direction perpendicular to the optical axis. Therefore the image-blur correcting lens element has to be made larger; and still further, the thickness thereof also increases. Since the image-blur correcting lens element itself becomes heavier, a more load is imposed on the drive mechanism thereof. As a result, a drive mechanism with strong driving force is required, which causes an increase on the size of the entire apparatus, and also causes an increase on the production costs thereof.

Particularly, in the case of a small lens system, such as a binocular, in which some of lens elements in the objective optical system thereof are utilized as the image-blur correcting lens elements, it is considered to be essential to make the diameter of the image-blur correcting lens element larger than that of another lens element(s) in the objective optical system. Accordingly, considering the amount of decentering when blur of an image is corrected, and the size of the drive members for the image-blur correcting lens elements, the body containing the image-blur correcting viewing-optical system is unavoidably made larger.

SUMMARY OF THE INVENTION

The present invention is to provide a light-weight and miniaturized image-blur correcting viewing-optical system, which is attained by miniaturizing image-blur correcting lens elements which constitute a portion of an objective optical system thereof.

According to the present invention, there is provided an image-blur correcting viewing-optical system including an objective optical system, an image-erecting optical system and an eyepiece optical system. The objective optical system includes a front lens group having a positive lens element, a negative lens-element and a positive lens element, and a rear lens group constituting an image-blur correcting lens element which is driven in a direction perpendicular to the optical axis, in this order from the object. The image-blur correcting viewing-optical system satisfies the following condition:

$$0.5 \leq hc/hmax \leq 0.8 \quad (1)$$

wherein hc designates the radius of an axial open aperture of the first surface of the image-blur correcting lens element; and hmax designates the radius of an axial open aperture of the first surface of the front lens group of the objective optical system.

The image-blur correcting viewing-optical system according to the present invention satisfies the following condition:

$$0.5 \text{ mm} < |\tan 1°/(\phi 0 - \phi 1)| < 5 \text{ mm} \quad (2)$$

wherein $\phi 0$ designates the power of the entire objective optical system, and $\phi 1$ designates the power of the front lens group.

The image-blur correcting viewing-optical system according to the present invention satisfies the following condition:

$$0.04 < \Delta hc/(2 \times hc) < 0.2 \quad (3)$$

wherein $\Delta hc$ designates the amount of correction for decentering with respect to a blur angle of 1° on the image-blur correcting lens element.

The present disclosure relates to subject matter contained in Japanese Patent Application No. 2001-139884 (filed on May 10, 2001) which is expressly incorporated herein in its entirety.

BRIEF DESCRIPTION OF THE DRAWINGS

The present invention will be discussed below in detail with reference to the accompanying drawings, in which:

FIGS. 13A, 13B, 13C and 13D show aberrations occurred in the image-blur correcting viewing-optical system shown in FIG. 11;

FIG. 14 is a diagram showing transverse aberration occurred in the image-blur correcting viewing-optical system of FIG. 11, before the image-blur correcting lens element is driven;

DESCRIPTION OF THE PREFERRED EMBODIMENTS

Figure 1:
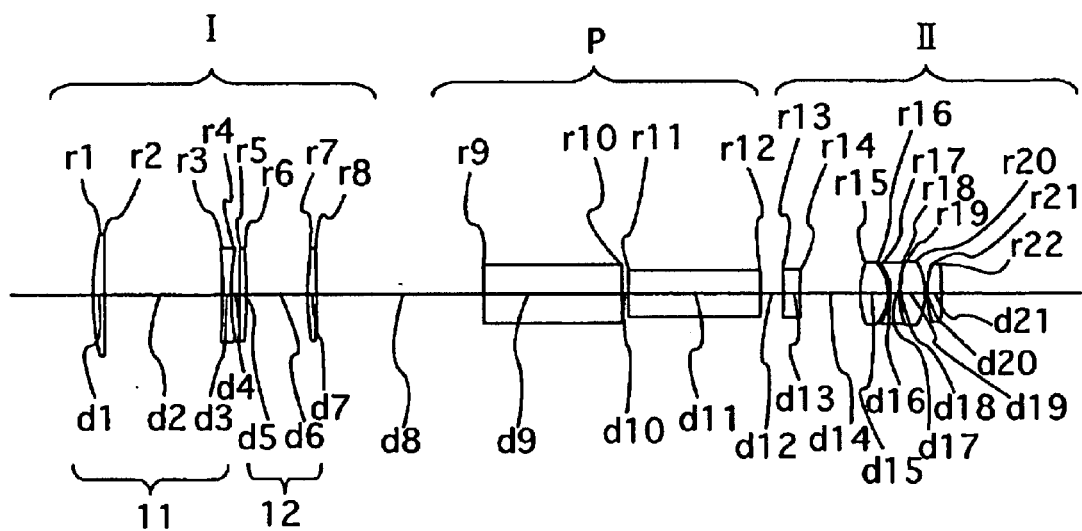
FIG. 1 shows a lens arrangement of an image-blur correcting viewing-optical system according to a first embodiment of the present invention, before an image-blur correcting lens element thereof is driven.

The present invention relates to the size (diameter) of an image-blur correcting lens element to be used in an image-blur correcting viewing-optical system, in which the image-blur correcting lens element is driven in a direction perpendicular to the optical axis, and which includes an objective optical system I, an image-erecting optical system P, and an eyepiece optical system II, in this order from the object. In this type of image-blur correcting viewing-optical systems, the diameter of an axial open aperture of the image-blur correcting lens element has conventionally been designed to be the same as an axial open aperture of the first surface of the objective optical system I. Accordingly, if the axial open aperture of the first surface of the objective optical system I is made larger, the entire image-blur correcting viewing-optical system also becomes larger. On the other hand, if the diameter of the image-blur correcting lens element is made smaller, the axial open aperture of the first surface of the objective optical system I also becomes smaller.

However, according to the inventors' analyses, even if the axial open aperture of the image-blur correcting lens element is made smaller than the axial open aperture of the first surface of the objective optical system I, the optical performance of the image-blur correcting viewing-optical system does not deteriorate; rather, such a small diameter of the image-blur correcting lens element contributes to achieving a light-weight and miniaturized image-blur correcting viewing-optical system.

Condition (1) specifies the diameter of an axial open aperture of the image-blur correcting lens element, in accordance with the inventors' analyses mentioned above.

The objective optical system I includes a separate-type (triplet) front lens group 11 constituted by a positive lens element, a negative lens element and a positive lens element, and a rear lens group 12 constituting the image-blur correcting lens element which is driven in a direction perpendicular to the optical axis, in this order from the object. Note that the front lens group 11 functions as a focal converter.

When the radius of an axial open aperture of the first surface of the image-blur correcting lens element is designated as 'hc', and the radius of an axial open aperture of the first (i.e., the most object-side) surface of the front lens group 11 is designated as 'hmax', condition (1) is defined as follows:

$$0.5 \leq hc/hmax \leq 0.8$$

If hc/hmax exceeds the lower limit of condition (1), the optical performance deteriorates. Consequently, in order to compensate for such deterioration, the number of lens elements of the front lens group (a focal converter) 11 of the objective optical system I is increased, and/or the refractive index of the lens elements thereof becomes larger; and as a result the overall production costs increases.

If hc/hmax exceeds the upper limit of condition (1), the diameter of the rear lens group (the image-blur correcting lens element) 12 becomes too large, so that the overall production costs increase due to such an increase of the size of the image-blur correcting lens element 12.

If the diameter of the image-blur correcting lens element 12 is determined so as to satisfy condition (1), the overall weight and size of the image-blur correcting viewing-optical system can be reduced, and accordingly, the overall production costs can be reduced, without deteriorating the optical performance of the image-blur correcting viewing-optical system.

Condition (2) specifies the blur-correcting sensitivity of the objective optical system I.

If $|\tan 1°/(\phi 0 - \phi 1)|$ exceeds the upper limit of condition (2), the blur-correcting sensitivity becomes too low, so that the traveling distance of the image-blur correcting lens element 12 becomes too long. Consequently, the body containing the image-blur correcting viewing-optical system becomes larger.

If $|\tan 1°/(\phi 0 - \phi 1)|$ exceeds the lower limit of condition (2), the blur-correcting sensitivity becomes too high, so that the control thereof becomes difficult.

Condition (3) specifies the amount of correction for decentering with respect to a blur angle of 1° on the image-blur correcting lens element 12 (the amount of decentering: the DEC amount).

If $\Delta hc/(2 \times hc)$ exceeds the upper limit of condition (3), the amount of correction for decentering on the image-blur correcting lens element 12 becomes too large, so that shading due to the correcting of decentering increases. As a result, peripheral illumination decreases.

If $\Delta hc/(2 \times hc)$ exceeds the lower limit of condition (3), the blur-correcting sensitivity of the image-blur correcting lens element 12 becomes too high, so that the correcting of image blur becomes difficult.

Specific numerical examples will herein be discussed. In the tables and diagrams, r designates the radius of curvature, d designates the lens thickness or space between lens surfaces, Nd designates the refractive index of the d line, and ν designates the Abbe number. W designates the half angle-of-view (°) (the angle formed by the optical axis and a principal light ray of a bundle of light rays to be incident on the objective optical system from the side of an object), m designates the magnification. In the diagrams of aberrations, ER designates the diameter of the exit pupil (mm) B designates the angle formed by the optical axis and an emitting light ray. In the diagrams of chromatic aberration represented by spherical aberration, the solid line and the two types of dotted lines respectively indicate spherical aberration with respect to the d, g and C lines. In the diagrams of transverse chromatic aberration, the two types of dotted lines respectively indicate magnification with respect to the g and C lines; however, the d line as the base line coincides with the ordinate. Also, in the diagrams of astigmatism, S designates the sagittal image, and M designates the meridional image. In the diagrams of transverse aberration, DIS designates distortion, DS designates field curvature in the sagittal direction, and DM designates filed curvature in the meridional direction.

In addition to the above, an aspherical surface which is symmetrical with respect to the optical axis is defined as follows:

$$X=cy^2/(1+[1-\{1+K\}c^2y^2]^{1/2})+A4y^4+A6y^6+A8y^8+A10y^{10}$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

[Embodiment 1]

FIGS. 1 through 5 show the first embodiment applied to an image-blur correcting telescope.

FIG. 1 shows the lens arrangement of the image-blur correcting viewing-optical system of the image-blur correcting telescope, before the image-blur correcting lens element 12 thereof is driven.

The optical system of the image-blur correcting telescope includes an objective optical system I, an image-erecting optical system (image erecting prism) P, and an eyepiece optical system II, in this order from the object. The objective optical system I includes a front lens group 11 having a positive lens element, a negative lens element and a positive lens element, and a rear lens group 12 which constitutes an image-blur correcting lens element 12, in this order from the object. The eyepiece optical system II includes a negative lens element, a positive lens element, a negative lens element, a positive lens element and a positive lens element, in this order from the object. Table 1 shows the numerical data thereof.

Figure 2:
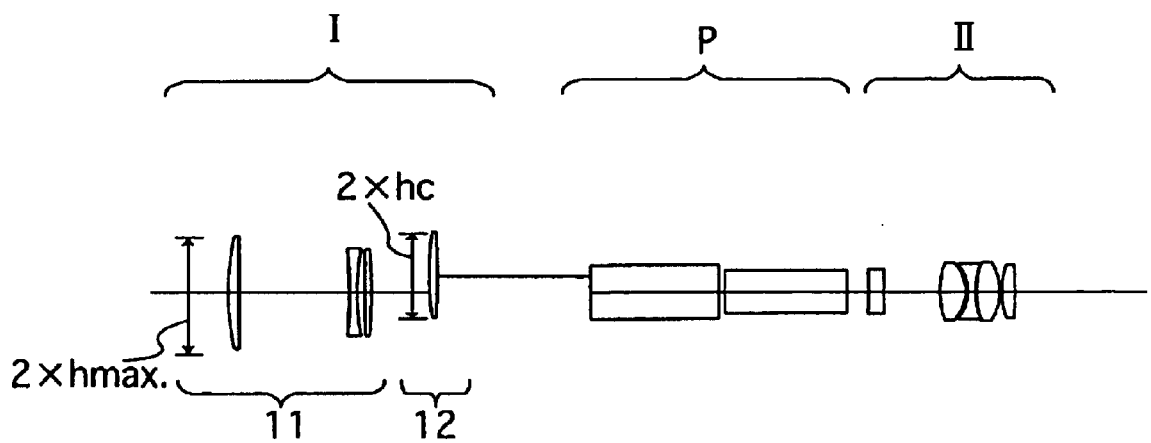
FIG. 2 shows the lens arrangement of FIG. 1, when the image-blur correcting lens element is driven.
Figure 3A:
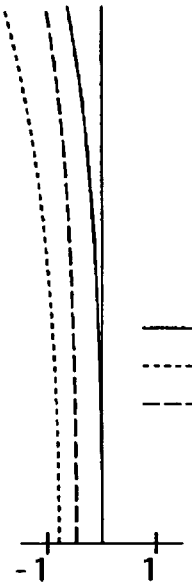
FIGS. 3A, 3B, 3C and 3D show aberrations occurred in the image-blur correcting viewing-optical system shown in FIG. 1.
Figure 3B:
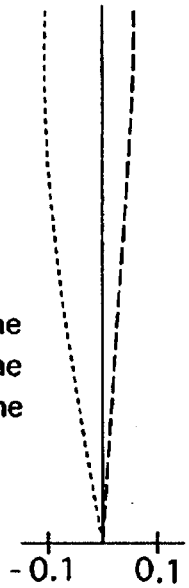
Figure 3C:
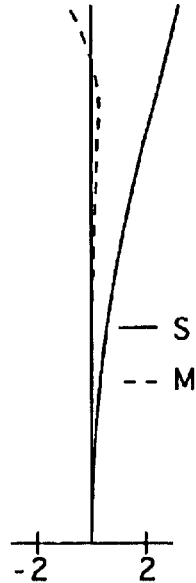
Figure 3D:
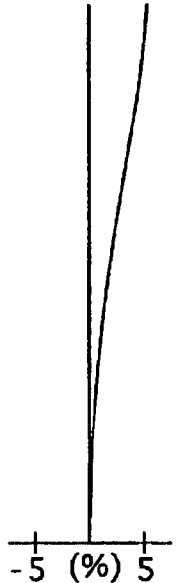
Figure 4:
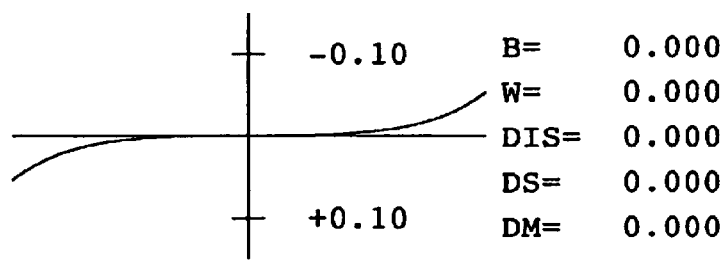
FIG. 4 is a diagram showing transverse aberration occurred in the image-blur correcting viewing-optical system of FIG. 1, before the image-blur correcting lens element is driven.
Figure 5:
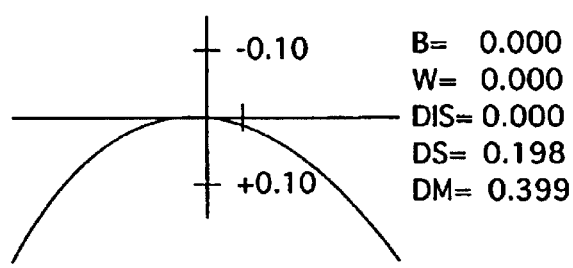
FIG. 5 is a diagram showing transverse aberration occurred in the image-blur correcting viewing-optical system of FIG. 1, with respect to a blur angle of 1° on the image-blur correcting lens element.

FIG. 2 shows the lens arrangement of FIG. 1, when the image-blur correcting lens element 12 is driven. Furthermore, in FIG. 2, the diameter (2×hc) of the axial open aperture of the image-blur correcting lens element 12, and the diameter (2×hmax) of the axis open aperture of the first surface of the front lens group 11 are indicated. FIGS. 3A through 3D show aberrations occurred in the image-blur correcting viewing-optical system shown in FIG. 1. FIG. 4 is a diagram showing transverse aberration occurred in the image-blur correcting viewing-optical system of FIG. 1, before the image-blur correcting lens element is driven. FIG. 5 is a diagram showing transverse aberration occurred in the image-blur correcting viewing-optical system of FIG. 1, with respect to a blur angle of 1° on the image-blur correcting lens element 12.

TABLE 1 m = 10.0
W = 2.5

| Surface No. | r | d | Nd | ν |
|---|---|---|---|---|
| 1 | 69.789 | 2.900 | 1.51633 | 64.1 |
| 2 | −14947.000 | 29.090 | — | — |
| 3 | −141.696 | 2.000 | 1.62004 | 36.3 |
| 4 | 66.393 | 2.010 | — | — |

TABLE 1-continued m = 10.0
W = 2.5

| Surface No. | r | d | Nd | ν |
|---|---|---|---|---|
| 5 | 450.000 | 1.700 | 1.51633 | 64.1 |
| 6 | −149.326 | 15.000 | — | — |
| 7 | 75.000 | 2.200 | 1.51633 | 64.1 |
| 8 | −230.006 | 40.500 | — | — |
| 9 | ∞ | 34.000 | 1.56883 | 56.3 |
| 10 | ∞ | 1.500 | — | — |
| 11 | ∞ | 32.000 | 1.56883 | 56.3 |
| 12 | ∞ | 5.660 | — | — |
| 13 | −93.620 | 4.000 | 1.49176 | 57.4 |
| 14* | 93.620 | 14.830 | — | — |
| 15 | 23.936 | 6.770 | 1.49176 | 57.4 |
| 16* | −10.075 | 0.700 | — | — |
| 17 | −11.190 | 2.000 | 1.58547 | 29.9 |
| 18 | 25.294 | 0.200 | — | — |
| 19 | 24.157 | 6.200 | 1.49176 | 57.4 |
| 20 | −15.260 | 0.500 | — | — |
| 21 | 22.703 | 3.500 | 1.60311 | 60.7 |
| 22 | −75.123 | — | — | — |

*designates the aspherical surface which is rotationally symmetrical with respect to the optical axis.
Aspherical surface data (the aspherical surface coefficients not indicated are zero (0.00)):
Surface No.14 K = 0.00 A4 = −0.1200 × 10$^{-4}$
Surface No.16 K = −1.00 A4 = −0.4600 × 10$^{-5}$

[Embodiment 2]

FIGS. 6 through 10 show the second embodiment applied to the image-blur correcting telescope.

Figure 6:
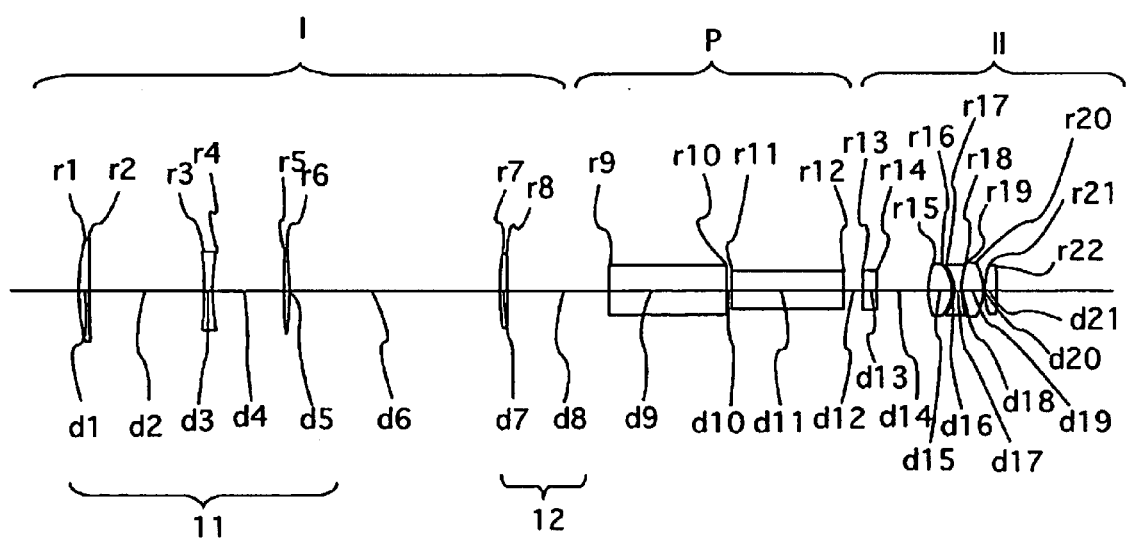
FIG. 6 shows a lens arrangement of the image-blur correcting viewing-optical system according to a second embodiment of the present invention, before the image-blur correcting lens element thereof is driven.

FIG. 6 shows the lens arrangement of the image-blur correcting viewing-optical system of the image-blur correcting telescope, before the image-blur correcting lens element 12 thereof is driven. Table 2 shows the numerical data thereof.

Figure 7:
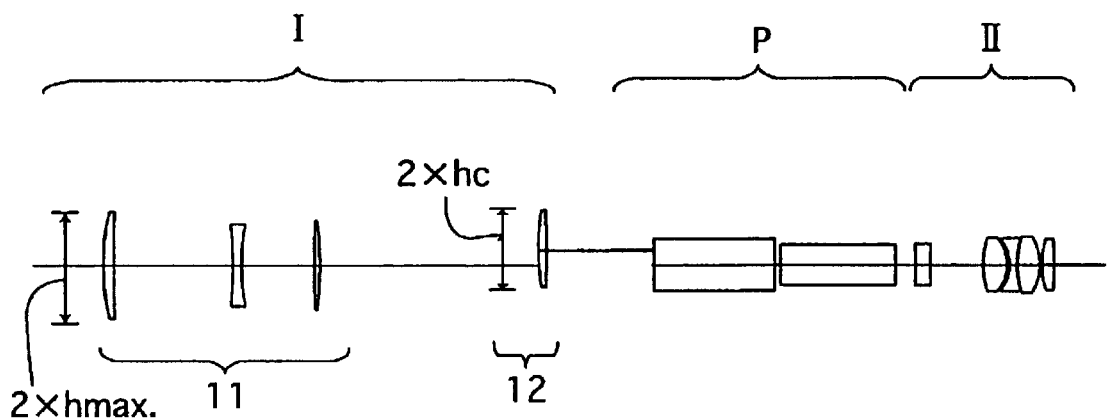
FIG. 7 shows the lens arrangement of FIG. 6, when the image-blur correcting lens element is driven.
Figure 8A:
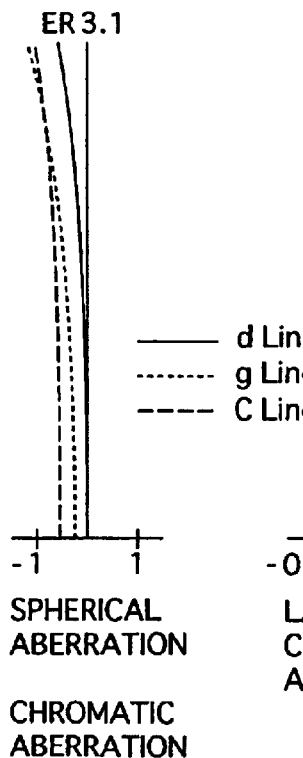
FIGS. 8A, 8B, 8C and 8D show aberrations occurred in the image-blur correcting viewing-optical system shown in FIG. 6.
Figure 8B:
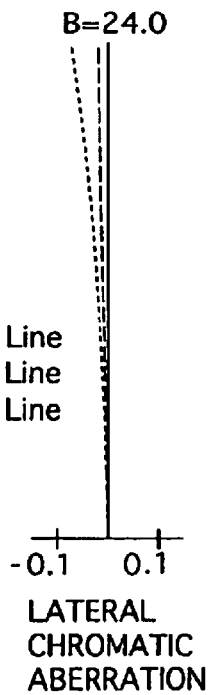
Figure 8C:
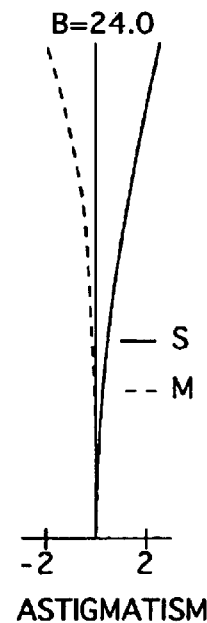
Figure 8D:
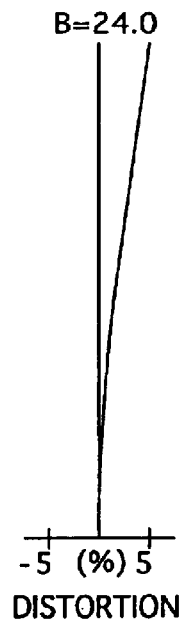
Figure 9:
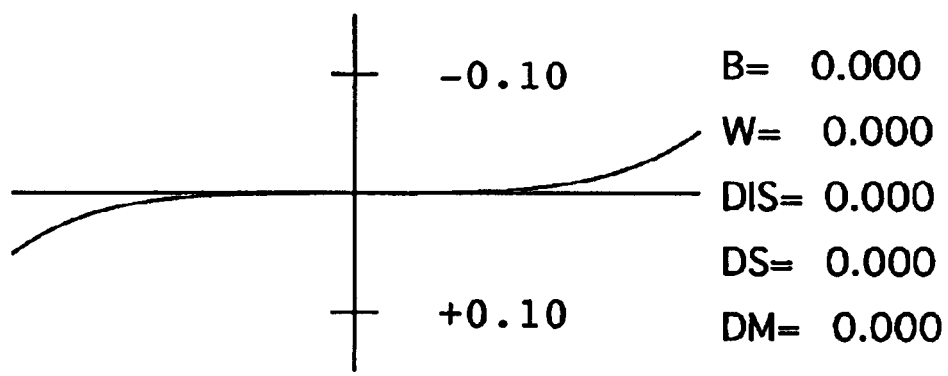
FIG. 9 is a diagram showing transverse aberration occurred in the image-blur correcting viewing-optical system of FIG. 6, before the image-blur correcting lens element is driven.
Figure 10:
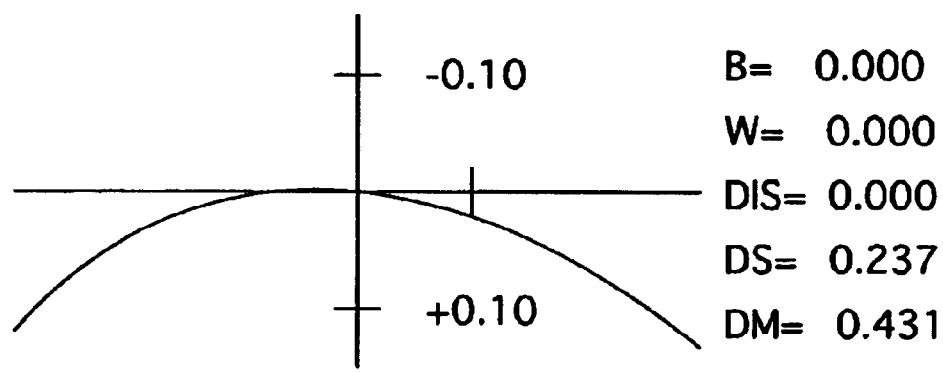
FIG. 10 is a diagram showing transverse aberration occurred in the image-blur correcting viewing-optical system of FIG. 6, with respect to a blur angle of 1° on the image-blur correcting lens element.

FIG. 7 shows the lens arrangement of FIG. 6, when the image-blur correcting lens element 12 is driven. Furthermore, in FIG. 7, the diameter (2×hc) of the axial open aperture of the image-blur correcting lens element 12, and the diameter (2×hmax) of the axis open aperture of the first surface of the front lens group 11 are indicated. FIGS. 8A through 8D show aberrations occurred in the image-blur correcting viewing-optical system shown in FIG. 6. FIG. 9 is a diagram showing transverse aberration occurred in the image-blur correcting viewing-optical system of FIG. 6, before the image-blur correcting lens element 12 is driven. FIG. 10 is a diagram showing transverse aberration occurred in the image-blur correcting viewing-optical system of FIG. 6, with respect to a blur angle of 1° on the image-blur correcting lens element 12. The basic lens arrangement is the same as the first embodiment.

TABLE 2 m = 9.7
W = 2.5

| Surface No. | r | d | Nd | ν |
|---|---|---|---|---|
| 1 | 62.438 | 3.000 | 1.51633 | 64.1 |
| 2 | 355.246 | 33.070 | — | — |
| 3 | −137.852 | 2.500 | 1.62004 | 36.3 |
| 4 | 64.834 | 20.300 | — | — |
| 5 | 266.387 | 1.500 | 1.51633 | 64.1 |
| 6 | −105.654 | 60.780 | — | — |
| 7 | 66.679 | 2.200 | 1.51633 | 64.1 |
| 8 | −1341.098 | 30.190 | — | — |
| 9 | ∞ | 34.000 | 1.56883 | 56.3 |
| 10 | ∞ | 1.500 | — | — |
| 11 | ∞ | 32.000 | 1.56883 | 56.3 |
| 12 | ∞ | 5.660 | — | — |

TABLE 2-continued m = 9.7
W = 2.5

| Surface No. | r | d | Nd | ν |
|---|---|---|---|---|
| 13 | −93.620 | 4.000 | 1.49176 | 57.4 |
| 14* | 93.620 | 14.830 | — | — |
| 15 | 23.936 | 6.770 | 1.49176 | 57.4 |
| 16* | −10.075 | 0.700 | — | — |
| 17 | −11.190 | 2.000 | 1.58547 | 29.9 |
| 18 | 25.294 | 0.200 | — | — |
| 19 | 24.157 | 6.200 | 1.49176 | 57.4 |
| 20 | −15.260 | 0.500 | — | — |
| 21 | 22.703 | 3.500 | 1.60311 | 60.7 |
| 22 | −75.123 | — | — | — |

*designates the aspherical surface which is rotationally symmetrical with respect to the optical axis.
Aspherical surface data (the aspherical surface coefficients not indicated are zero (0.00)):
Surface No.14 K = 0.00 A4 = −0.1200 × $10^{-4}$
Surface No.16 K = −1.00 A4 = −0.4600 × $10^{-5}$

[Embodiment 3]

FIGS. 11 through 15 show the third embodiment applied to the image-blur correcting telescope.

Figure 11:
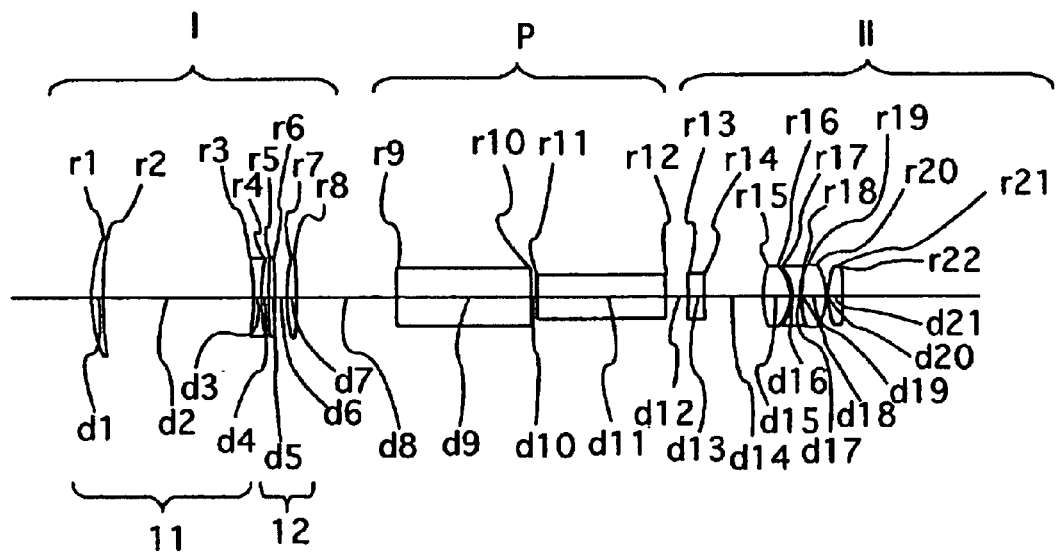
FIG. 11 shows a lens arrangement of the image-blur correcting viewing-optical system according to a third embodiment of the present invention, before the image-blur correcting lens element thereof is driven.

FIG. 11 shows the lens arrangement of the image-blur correcting viewing-optical system of the image-blur correcting telescope, before an image-blur correcting lens element 12 thereof is driven. Table 3 shows the numerical data thereof.

Figure 12:
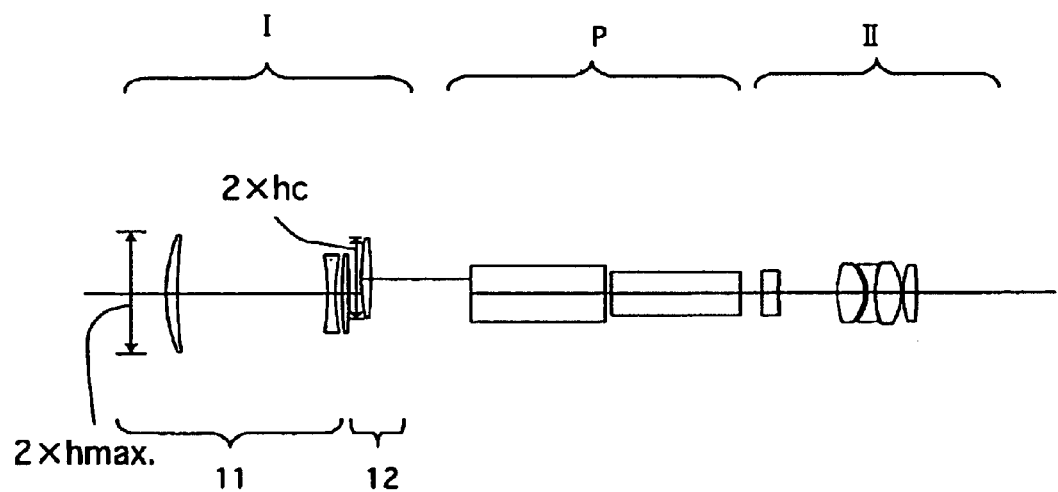
FIG. 12 shows the lens arrangement of FIG. 11, when the image-blur correcting lens element is driven.
Figure 15:
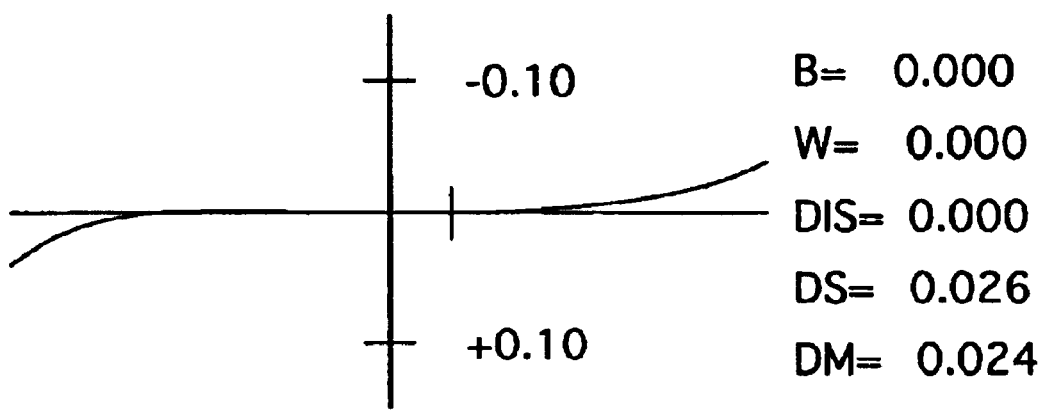
FIG. 15 is a diagram showing transverse aberration occurred in the image-blur correcting viewing-optical system of FIG. 11, with respect to a blur angle of 1° on the image-blur correcting lens element.

FIG. 12 shows the lens arrangement of FIG. 11, when the image-blur correcting lens element 12 is driven. Furthermore, in FIG. 12, the diameter (2×hc) of the axial open aperture of the image-blur correcting lens element 12, and the diameter (2×hmax) of the axis open aperture of the first surface of the front lens group 11 are indicated. FIGS. 13A through 13D show aberrations occurred in the image-blur correcting viewing-optical system shown in FIG. 11. FIG. 14 is a diagram showing transverse aberration occurred in the image-blur correcting viewing-optical system of FIG. 11, before the image-blur correcting lens element 12 is driven. FIG. 15 is a diagram showing transverse aberration occurred in the image-blur correcting viewing-optical system of FIG. 11, with respect to a blur angle of 1° on the image-blur correcting lens element 12. The basic lens arrangement is the same as the first embodiment.

TABLE 3 m = 9.7
W = 2.5

| Surface No. | r | d | Nd | ν |
|---|---|---|---|---|
| 1 | 39.762 | 2.900 | 1.51633 | 64.1 |
| 2 | 112.830 | 38.260 | — | — |
| 3 | −57.793 | 2.000 | 1.62004 | 36.3 |
| 4 | 47.305 | 1.800 | — | — |
| 5 | 131.446 | 1.700 | 1.51633 | 64.1 |
| 6 | −146.964 | 3.000 | — | — |
| 7 | 46.878 | 2.400 | 1.49176 | 57.4 |
| 8* | −122.792 | 25.050 | — | — |
| 9 | ∞ | 34.000 | 1.56883 | 56.3 |
| 10 | ∞ | 1.500 | — | — |
| 11 | ∞ | 32.000 | 1.56883 | 56.3 |
| 12 | ∞ | 5.660 | — | — |
| 13 | −93.620 | 4.000 | 1.49176 | 57.4 |
| 14* | 93.620 | 14.830 | — | — |
| 15 | 23.936 | 6.770 | 1.49176 | 57.4 |
| 16* | −10.075 | 0.700 | — | — |
| 17 | −11.190 | 2.000 | 1.58547 | 29.9 |
| 18 | 25.294 | 0.200 | — | — |
| 19 | 24.157 | 6.200 | 1.49176 | 57.4 |
| 20 | −15.260 | 0.500 | — | — |
| 21 | 22.703 | 3.500 | 1.60311 | 60.7 |
| 22 | −75.123 | — | — | — |

*designates the aspherical surface which is rotationally symmetrical with respect to the optical axis.
Aspherical surface data (the aspherical surface coefficients not indicated are zero (0.00)):
Surface No.8 K = 0.00 A4 = 0.1680 × $10^{-5}$
Surface No.14 K = 0.00 A4 = −0.1200 × $10^{-4}$
Surface No.16 K = −1.00 A4 = −0.4600 × $10^{-5}$ The parameters of each embodiment are shown in Table 4.

TABLE 4

| Embodiment | hc | hmax | φ0 | φ1 | Δhc |
|---|---|---|---|---|---|
| 1 | 11.49 | 15.00 | 0.007457 | 0.000482 | 2.500 |
| 2 | 10.74 | 15.00 | 0.007711 | 0.001905 | 3.000 |
| 3 | 10.08 | 15.00 | 0.007688 | −0.001998 | 1.800 |

The numerical values of each condition of each embodiment are shown in Table 5.

TABLE 5

| Embodiment | Condition(1) | Condition(2) | Condition(3) |
|---|---|---|---|
| 1 | 0.766 | 2.503 | 0.109 |
| 2 | 0.716 | 3.006 | 0.140 |
| 3 | 0.672 | 1.802 | 0.089 |

As can be understood from the Table 5, the numerical values of each embodiment satisfy each condition. Furthermore, as can be understood from the aberration diagrams, the various aberrations are adequately corrected.

According to the above description, a light-weight and miniaturized image-blur correcting viewing-optical system, which is attained by miniaturizing the image-blur correcting lens element constituting a portion of an objective optical system thereof, can be obtained.

What is claimed is:

1. An image-blur correcting viewing-optical system comprising an objective optical system, an image-erecting optical system and an eyepiece optical system, wherein said objective optical system comprises a front lens group comprising a positive lens element, a negative lens element and a second positive lens element, and a rear lens group comprising an image-blur correcting lens element which is driven in a direction perpendicular to the optical axis, in this order from an object; and wherein said image-blur correcting viewing-optical system satisfies the following condition:

$0.5 \leq hc/hmax \leq 0.8$ wherein hc designates the radius of an axial open aperture of the first surface of said image-blur correcting lens element; and hmax designates the radius of an axial open aperture of the first surface of said front lens group of said objective optical system.

2. An image-blur correcting viewing-optical system according to claim 1, satisfying the following condition:

$$0.5 \text{ mm} < |\tan 1°/(\phi 0 - \phi 1)| < 5 \text{ mm}$$

wherein $\phi 0$ designates the power of said entire objective optical system, and $\phi 1$ designates the power of said front lens group.

3. An image-blur correcting viewing-optical system according to claim 1, satisfying the following condition:

$$0.04 < \Delta hc/(2 \times hc) < 0.2$$

wherein $\Delta hc$ designates the amount of correction for decentering with respect to 1° of image-blur correction on said image-blur correcting lens element.

* * * * *